3,112,599
PIVOTAL CONNECTING MEANS FOR
ROTARY DISK CUTTER
William L. Brewer, Jr., Minden, La., assignor to Dealer Associates, Inc., Minden, La., a corporation of Louisiana
Filed July 25, 1962, Ser. No. 212,378
8 Claims. (Cl. 56—295)

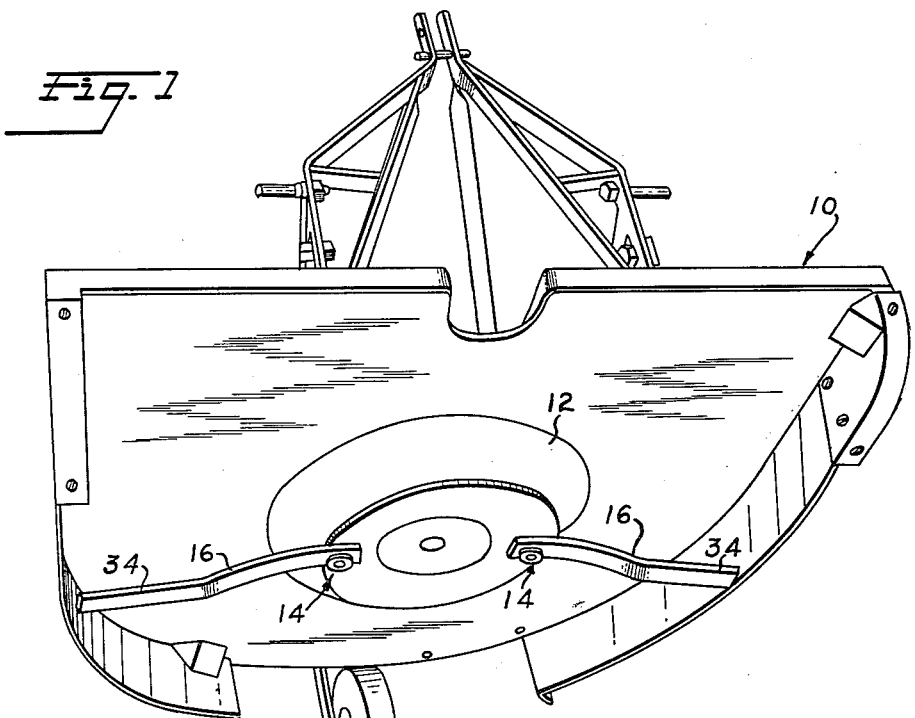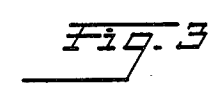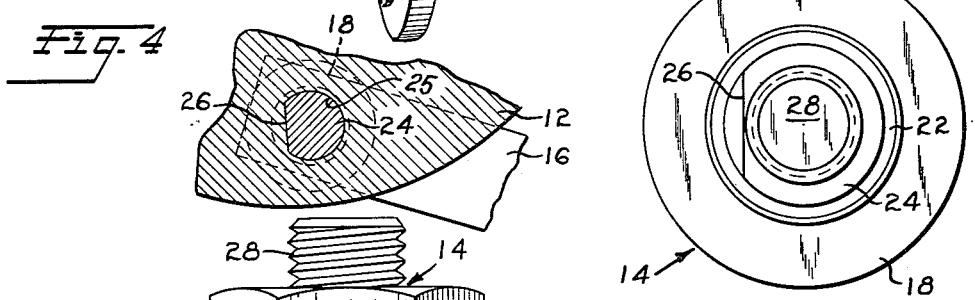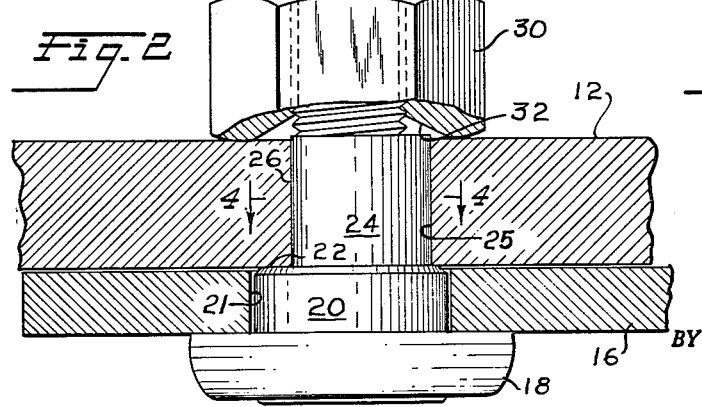

This invention relates to connecting elements and the prime object of the invention is the provision of a connecting element of the bolt and nut variety which is particularly, though not exclusively, adapted for swingably connecting a cutter blade element to a rotary disc type blade holder employed in mowing or brush cutting machines.

In the drawings:

FIG. 1 is a perspective view of a typical rotary mower which may employ the present invention for swingably connecting cutter blades to a disc type blade holder;

FIG. 2 is an enlarged vertical, fragmentary cross-sectional view showing the manner of use of the present invention;

FIG. 3 is a top plan view of the bolt of the present invention; and

FIG. 4 is a reduced, fragmentary horizontal cross-sectional view taken substantial on the line 4—4 of FIG. 2.

In the drawings the numeral 10 generally indicates the mower of FIG. 1 which is provided with a rotatably driven disc or blade holder 12 having swingably connected thereto by bolts 14, constructed in accordance with the invention, opposed cutter blades 16. Except for the bolts 14, the mower illustrated is in all respects conventional, it being recognized that in use the holder 12 is rotated at a high rate of speed by separate power means (not shown) to cause the blades 16 to be swung against vegetation and cut the same in a well-recognized manner. The blades 16 are swingably connected to the holder 12 so that when upon striking an uncuttable object such as a stump or rock, the blade is thereby kicked back or swung clear of the object thus avoiding damage to the blade or other part of the mower.

In accordance with the invention, the particular means for swingingly connecting the blades to the holder consists of the bolt 14 which at its lower end is provided with an enlarged head 18, which is relatively quite flat for reasons that will be explained, and has extending upwardly therefrom a shouldered bearing part 20 which pivotally receives a mating hole 21 adjacent one end of the blade 16. It will be noted in FIG. 2, that the vertical height of the bearing part 20 is slightly greater than the thickness of the blade 16 so that when the shoulder 22 of the bearing part 20 abuts the lower side of the holder 12 there is sufficient space provided between the upper surface of the head 18 and the lower surface of the holder 12 to permit the blade 16 to swing freely without binding.

Extending upwardly from the bearing part 20 is an integral shank part 24 which is non-circular in a cross-section and is received in a complementarily shaped hole 25 extending through the holder 12. Desirably the non-circular shape is afforded by cutting off a vertical segment of the shank part 24 which is first formed as a cylinder concentric with the axis of the bolt. Thus, a flat surface 26 is provided along a side of the shank 24 and by providing a hole through the holder 12 of the same shape as the shank in cross section, when the latter is inserted into the hole, it is positively prevented from rotating with respect to the holder 12.

Integral with the upper surface of the shank portion 24 is a threaded part 28 of reduced diameter which is adapted to receive a nut 30. As clearly shown in FIG. 2, the underside of the nut is provided with a concentric conical recess 32 which, in accordance with the invention, is adapted to accommodate any part of the shank portion 26 which may project slightly above the surface of the holder 12. In FIG. 2 the upper edge of the shank portion 24 is shown, for illustrative purposes, as extending slightly above the surface of the holder 12 into the recess 32 and it will be apparent from an inspection of FIG. 2 that the necessity of precise vertical dimensioning of the shank 24 with respect to the thickness of the holder 12 is obviated and, within limits, variation in the two dimensions may exist without in anyway interfering with the ability of the nut 30 to be screwed into tight engagement with the upper surface of the holder 12.

Another particular advantage of the above described arrangement is that it permits the shank part 24 to extend entirely through the holder 12 and thus be supported by the side of the mating hole in the holder throughout its entire length. Thus shocks acting laterally on the bolt which would tend to enlarge the hole in the holder are resisted with the maximum available material, which would not be the case if the threaded part were designed to extend partly into the hole in order to insure tightening of the nut. With the shank part of non-circular cross section, the constant swinging or oscillation of a blade during mowing operation cannot possibly turn the bolt with respect to the blade holder 12 so that the hole is not enlarged nor the bolt diameter reduced by abrading action of the latter on the side of the hole. Further, when the nut 30 is tightened it cannot be loosened by rotation of the bolt thereby eliminating the necessity for lock washers which are subject to fatigue failure. The threaded part 28 is of less diameter than the shank part 24 in order that the threads may be effectively protected against damage by the sides of the hole in the holder 12 during assembly.

A particularly desirable feature of the bolt of the invention is that it eliminates separate bearing spacers or bushings which have usually been required in the prior art where the blades have been swingably connected to the holder by conventional bolts. The head part 18 of the bolt is made relatively flat for the purpose of permitting the downturned end portion 34 of a blade (see FIG. 1) to swing freely through 360° without engaging the bolt head of an opposite blade. Thus blade length need not be limited by the diametral spacing between bolt heads and cutting efficiency is increased, particularly for heavy brush where the brush is only partly cut by a single blow of the blade and a second blade must pass over the end of the first blade without interference to deliver a second blow and insure complete severing of the brush.

The bolt of the present invention has been and is being used with complete satisfaction on large, heavy duty tractor drawn brush cutters and has eliminated substantially all of the problems caused by the blade fastening means used heretofore. It will be apparent that the bolt of the invention is not limited to use with brush cutters but may be readily used wherever it is desirable to connect one member to another with both members being capable of relative rotary movement with respect to each other in parallel planes. It will be understood that the bolt of the invention is susceptible to a variety of changes and modifications without departing from the scope and spirit of the appended claims.

What is claimed is:

1. In combination with first and second members capable of relative rotary movement with respect to each other in parallel planes, a unitary bolt-like element having a head part at one end, a cylindrical bearing part of less diameter than said head part and integral with one side thereof, said bearing part being received in a mating opening in the first of said members and having an axial length slightly greater than the corresponding thickness of said member, a non-circular shank part integral with said bearing part on the side thereof opposite said head part, said shank part being received in a complementarily shaped hole in said second member and having an axial length substantially equal to the thickness of said member, an integral shoulder at the juncture of said shank and bearing parts and extending radially beyond said shank part and in abutting engagement with said second member radially beyond the hole therein, a threaded part integral with the end of said shank part opposite said shoulder and extending beyond said member, and a nut engaged with the threads of said threaded part.

2. The connecting means of claim 1 wherein said non-circular shank part comprises a segmented cylinder.

3. The connecting means of claim 2 wherein said integral shoulder has a diameter substantially equal to the bearing part and the diameter of said shank part is less than the diameter of said bearing part.

4. The connecting means of claim 2 wherein said threaded part has a diameter less than the diameter of said shank part.

5. The combination of claim 1 wherein said nut has a concentric conical recess on one side thereof adapted to accommodate a portion of the shank part which may extend beyond the surface of said second member when said nut is tightened there against.

6. In combination with a disc type blade holder of a rotary mower and a cutter blade, means for swingably connecting said blade to said holder comprising a unitary bolt-like element having a flat head part, a cylindrical bearing-part of less diameter than said head part integral with one side of said head part, said bearing part being received in a mating opening at one end of a cutter blade and having an axial length slightly greater than the corresponding thickness of the end of said blade, a shank of segmental cylindrical shape having less diameter than said bearing part and being integral with the side of the latter opposite said head part and received against rotation in a complementarily shaped hole in said blade holder, the reduced diameter of said shank part affording a shoulder on the corresponding end of said bearing part abutting the adjacent surface of said holder, the length of said shank part being substantially equal to the thickness of said blade holder, a threaded part intergral with the opposite end of said shank part and extending beyond said blade holder, and a nut received on said threaded part.

7. The combination of claim 6 wherein said nut has a conical recess on one side thereof adapted to accommodate a portion of the shank part which may extend beyond the surface of said holder when said nut is tightened there against.

8. A combined bearing and connecting element for fastening a pair of relatively rotatable members together comprising a rigid unitary bolt-like element having a head part at one end, a cylindrical bearing part having an outer annular bearing surface adapted to rotatably support one of said members, said bearing part being of less diameter than said head part and integral with one side thereof, a non-circular shank part integral with said bearing part on the side thereof opposite said head part, said shank part being adapted to be fixed against rotation in a complementarily shaped hole in the second member, an integral shoulder at the junction of said shank and bearing part and extending radially beyond said shank part, and a threaded part integral with the end of said shank part opposite said shoulder.

References Cited in the file of this patent

UNITED STATES PATENTS

| | | |
|---|---|---|
| 108,927 | Miller | Nov. 1, 1870 |
| 1,049,590 | Mosher | Jan. 7, 1913 |
| 2,722,294 | Lagaard | Nov. 1, 1955 |
| 2,815,631 | Northcote et al. | Dec. 10, 1957 |
| 2,872,770 | Murphy et al. | Feb. 10, 1959 |
| 3,000,165 | Lill | Sept. 19, 1961 |

FOREIGN PATENTS

| | | |
|---|---|---|
| 534,439 | Australia | Mar. 6, 1941 |
| 884,172 | Great Britain | Dec. 6, 1961 |